July 7, 1970 H. A. BING 3,518,926
PHOTOGRAPHIC EXPOSURE CONTROL APPARATUS
Filed Aug. 1, 1967 2 Sheets-Sheet 1

INVENTOR.
Herbert A. Bing
BY
Brown and Mikulka
and
James L. Neal
ATTORNEYS

July 7, 1970   H. A. BING   3,518,926
PHOTOGRAPHIC EXPOSURE CONTROL APPARATUS
Filed Aug. 1, 1967   2 Sheets-Sheet 2

INVENTOR.
Herbert A. Bing
BY
Brown and Mikulka
and
James L. Neal
ATTORNEYS

United States Patent Office 3,518,926
Patented July 7, 1970

3,518,926
PHOTOGRAPHIC EXPOSURE CONTROL APPARATUS
Herbert A. Bing, Wayland, Mass., assignor to Polaroid Corporation, Cambridge, Mass., a corporation of Delaware
Filed Aug. 1, 1967, Ser. No. 657,667
Int. Cl. C01j 1/04
U.S. Cl. 95—10                                             9 Claims

ABSTRACT OF THE DISCLOSURE

Exposure control apparatus for a photographic camera includes a first photoresponsive device for influencing the selection of exposure aperture size in accordance with the light level of the scene being photographed and a second photoresponsive device for influencing exposure interval duration as a function of scene light level and the selected aperture size. A second aperture for controlling the amount of light incident upon the second photoresponsive device and the exposure aperture are adjusted concurrently with adjustments to the first photoresponsive device.

BRIEF SUMMARY OF THE INVENTION

This application describes exposure value control apparatus for a photographic camera which incorporates two photoresponsive control mechanisms. A first photoresponsive control serves to determine an optimum exposure aperture setting according to the light level of the scene being photographed. A second photoresponsive control means influences operation of the photographic shutter to control duration of the exposure interval in accordance with the light level of the scene being photographed and the exposure aperture setting determined by the first photoresponsive means. The response of the second photoresponsive means to the light level of the scene being photographed is determined by the amount of light incident upon a photosensitive element incorporated therein and arranged to receive light from the scene. Two factors influence the amount of light incident upon the photosensitive element. One is the level of scene brightness, (e.g., the amount of available light); the other is the setting of a second variable aperture means interposed between the photosensitive element and the scene.

The first photoresponsive means simultaneously operates to variably adjust the exposure aperture diaphragm size and to vary the light transmitting character of the second aperture means. The amount of light passing through the second aperture means is increased or decreased in proportion to increase or decrease of the exposure aperture size so that response of the photosensitive element is adjusted in accordance with the particular exposure aperture selected.

The coordination of the exposure aperture and the second aperture means is such that total amount of light incident upon the photosensitive element is constant when light levels of scenes being photographed are within a range of light levels which can be totally compensated for by adjustment of exposure aperture size. Thus, under this condition, the exposure interval is of constant duration. On the other hand, the light level may not be totally compensated for by the exposure aperture size adjustment, either because the range of available exposure aperture sizes is not broad enough to accommodate a very brightly or a very dimly illuminated scene, or because of human error in setting the exposure aperture size. In either event, the first photoresponsive means operates to vary the duration of exposure interval so as to produce exposure of optimum exposure value as will hereafter be explained.

When the two photoresponsive control means are used together, selection of the exposure aperture in accordance with the light level of the scene being photographed serves as a rough, or gross, exposure value control; control of the duration of the exposure interval in accordance with the light level and the exposure aperture size selected serves as a fine, or vernier, exposure value control.

In one preferred embodiment of this invention, the photoresponsive control means for determining exposure aperture setting comprises a comparison optical photometer and the photoresponsive control means for influencing exposure interval duration comprises a photoelectrically controlled timing circuit including a photosensitive element and a variable diaphragm interposed between the photosensitive element and the scene to be photographed.

The photoelectrically controlled timing circuit, if operating alone, must respond to the entire range of scene light levels incident upon the photosensitive element. Various factors reduce the circuit's operational accuracy when it operated over a relative wide range of such scene light levels. It has been determined, however, that these factors do not have significant effect when the circuit operates over a narrow range of scene light levels. The first photoresponsive means, in variably adjusting the photosensitive element aperture according to the adjustment of the exposure aperture, selects a small photosensitive element aperture for a small exposure aperture, when a scene is relatively brightly illuminated, and selects a large element aperture for a large exposure aperture, when a scene is relatively dimly lit. The total range of light values to which the element must respond is thus held within relatively narrow limits. It can be appreciated that this limits the range over which the timing circuit must operate so that the factors tending to derogate operational accuracy thereof do not have significant effect.

It is a primary object of this invention to provide reliable and accurate exposure control apparatus for a photographic camera.

A further object is to provide photographic exposure control apparatus incorporating two photoresponsive control mechanisms independently responsive to the light level of the scene being photographed.

Another object of this invention is to provide photographic exposure control apparatus including a first photo-responsive means for variably setting an exposure aperture diaphragm and a second photoresponsive means for variably controlling the duration of an exposure interval.

Other objects of the invention will in part be obvious and will in part appear hereinafter.

DETAILED DESCRIPTION OF THE DRAWINGS

Figure 1:
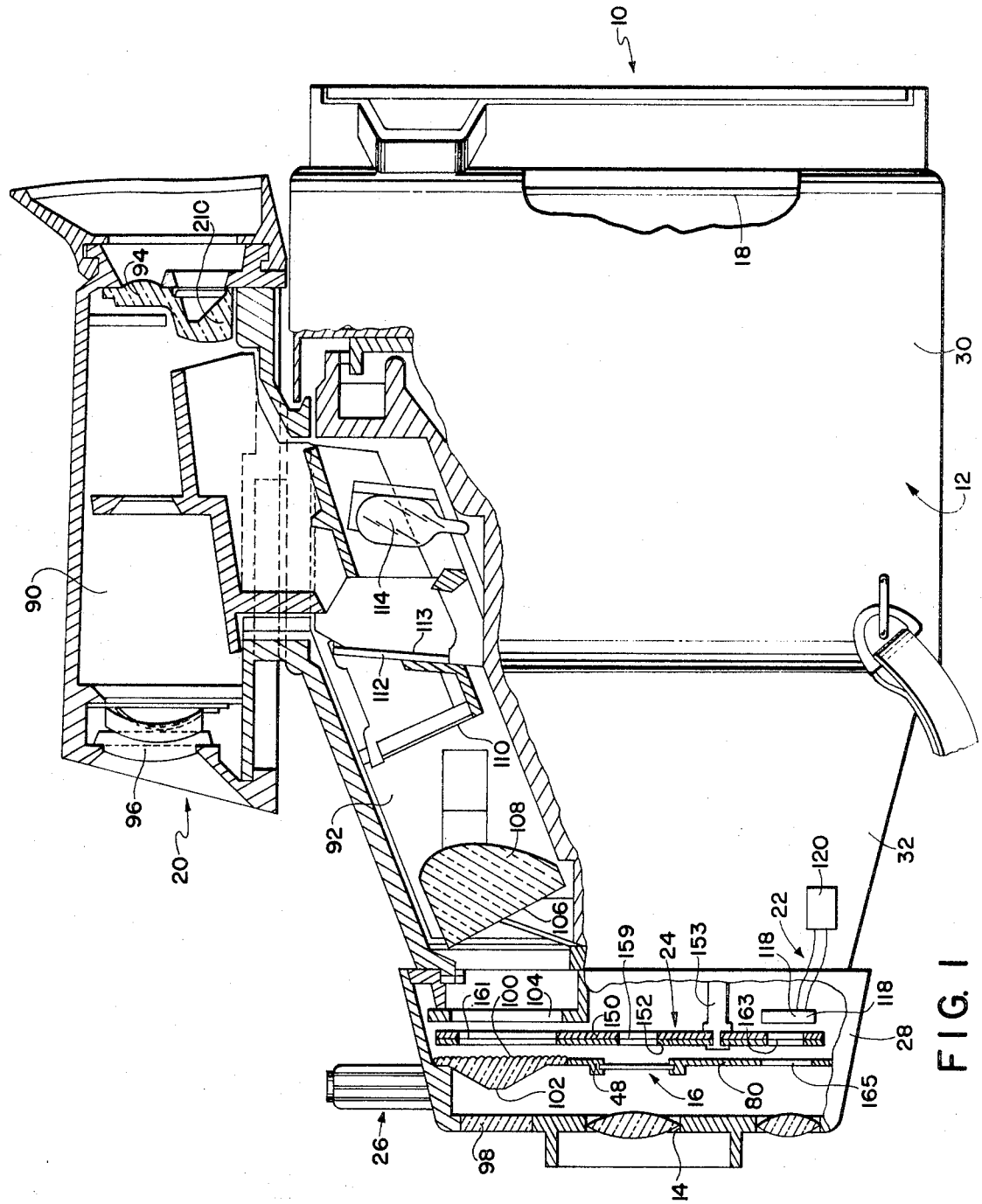
FIG. 1 is a partially broken away view showing a camera incorporating one embodiment of the exposure control apparatus of this invention.

One preferred embodiment will now be described in connection with the drawings. Referring now to FIG. 1, camera 10 includes light-tight housing 12, exposure aperture 14, shutter means 16, film plane 18, first photoresponsive means 20, second photoresponsive means 22, aperture setting means 24 and operating means 26.

Housing 12 includes forward portion 28, rear portion 30 and connecting portion 32. Exposure aperture 14 and shutter means 16 are mounted in forward portion 28 of the housing and film plane 18 is located in the rear portion.

Figure 2:
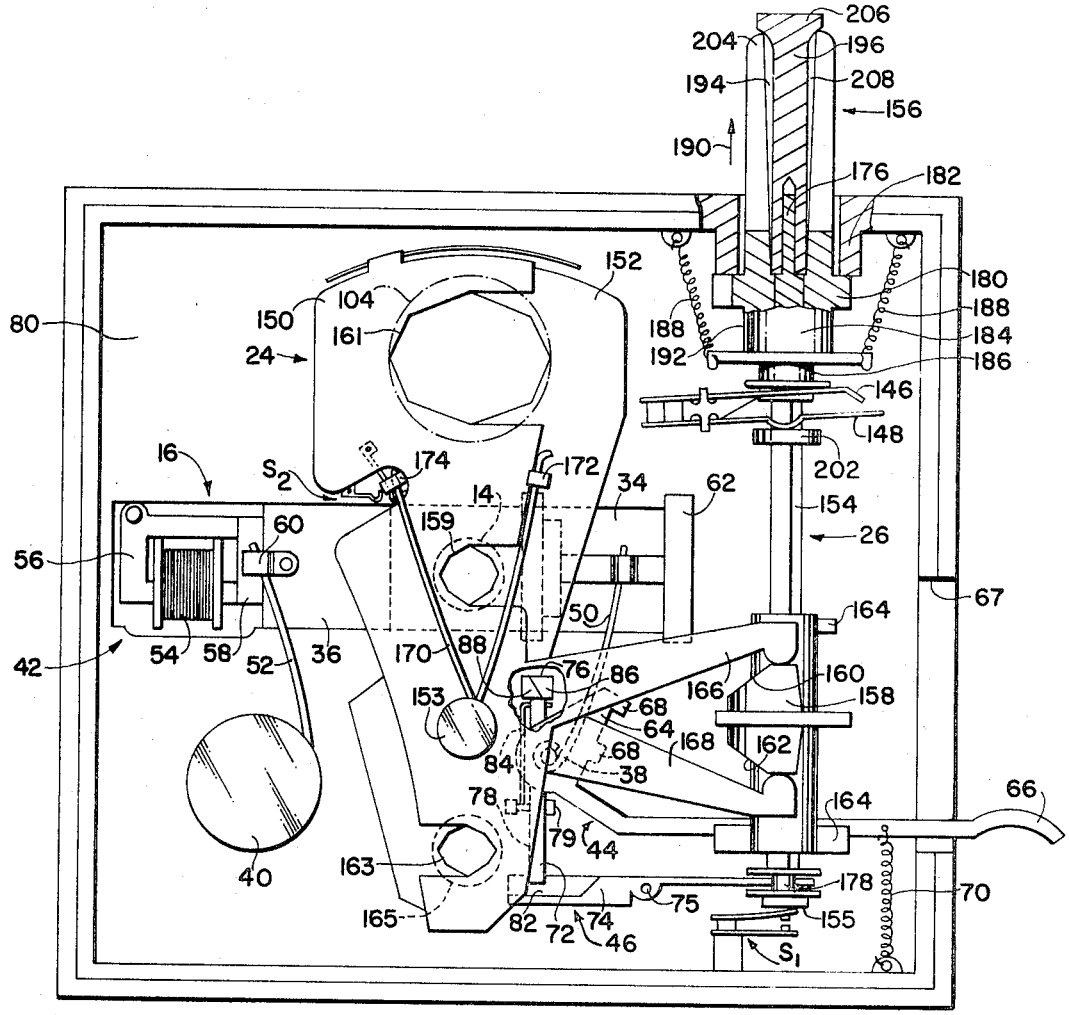
FIG. 2 is a view of one embodiment of the exposure control apparatus of this invention.

One suitable shutter means is shown in FIG. 2. Shutter means 16 includes first shutter blade 34, second shutter blade 36, first spring drive means 38, second spring drive means 40, electromechanical holding means 42, reset apparatus 44, and retaining means 46. The two shutter blades are mounted in juxtaposition with each other for independent movement along track 48 (FIG. 1) between initial and terminal positions. First spring means 38 includes elongated portion 50 and second spring means 40 includes elongated portion 52 for moving blades 34 and 36, respectively, from their initial positions to their terminal positions. Electromechanical holding means 42, including solenoid 54, U-shaped magnetizable core 56 and keeper 58, is mounted adjacent the initial position of blade 36 for controlling movement thereof in a manner hereinafter described. The keeper is arranged for magnetic contact with U-shaped core 56, and includes channeled bearing surface 60 adapted to receive elongated portion 52 of spring means 40. When the shutter blades are in their initial position, keeepr 58 abuts the U-shaped core 56, and shutter blade 34 abuts blade 36. Blade means 36 is thus positioned for unblocking aperture 14 and blade means 34 for blocking the aperture. In their terminal positions, blade 34 abuts stop 62 in unblocking relationship with aperture 14, and blade 36 abuts blade 34, in blocking relationship with aperture 14.

Reset apparatus 44 serves to advance shutter blades 34 and 36 from their terminal positions to their initial positions subsequent to exposure producing movement thereof. The reset apparatus is mounted adjacent first spring means 38 and includes reset lever 64 movable along a path complementary to that of elongated spring portion 50, and reset arm 66 extending from lever 64 and projecting through slot 67, outside portion 28 of housing 12 so that it may be manually operated. Reset lever 64 includes projections 68 extending into the path of movement of elongated spring portion 50, for selectively engaging portion 50 and imparting movement thereto against the bias of spring means 38. Spring 70 biases reset lever 64 to a rest position out of engaging relationship with elongated portion 25.

Releasable retaining means 46 includes member 72 and member 74. Member 72 has head portion 76 and elongated portion 78. The elongated portion is pivotally mounted at 79 upon support panel 80 and extends into engagement with member 74. Member 74 is pivotally mounted to panel 80 at 75, includes cam surface 82 on one end and is linked to operator means 26 at the other end. Spring 84 biases portion 66 into the path of movement of elongated portion 50 of spring drive means 38. Head portion 76 of member 72 contains cam surface 86 and seat 88. The cam surface permits movement of elongated portion 50 of spring 38 past member 66 when it is raised, as the shutter blades are advanced from their terminal positions to their initial positions by reset apparatus 44. After the shutter blades reach their terminal positions, seat 88 releasably engages elongated portion 50 to prevent premature return movement of the shutter blades to their terminal positions.

First photoresponsive means 20 includes view finder 90 and comparison photometer 28. The viewfinder incorporates eye lens 94 and lens 96. The optical elements of the comparison photometer will be described generally in the order in which they receive light from the scene The first element in the system is window 98 in the front wall of forward portion 28 of housing 12. For the purpose of efficiently collecting light from the scene through a pre-established collection angle, a molded pyramidal refracting prism 100 is provided. Prism 100 has planar surfaces 102 sloping divergingly away from the scene which efficiently collect light from the scene through a pre-established collection angle.

In order to control the amount of light entering the photometer, photometer aperture 104 is provided. Aperture 104 is defined by diaphragm means 161 formed by aperture setting means 24, which will subsequently be described in detail.

Light passing through the photometer aperture 104 impinges upon surface 106 of a prismatic lens 108 which deflects the light upwardly toward the rear of the viewfinder 90. The prismatic lens 108 acts as an optical condenser serving to decrease light losses and brighten a diffuser 110 located adjacent a target 112. Target 112 is generally transparent, but has a reflective pattern 113 disposed thereon. The pattern is illuminated by lamp 114 having a known luminous energy output. The level of illumination of the pattern serves as a standard of reference during operation of the photometer. As described above, light entering the photometer from the scene is directed to the diffuser 110 where it is displayed as a particular brightness level. In the operation of the photometer, the viewer visually compares the level of illumination of the diffuser 110, as seen through transparent areas of the target 112, with the level of illumination of the reflective pattern. When the levels of both the transparent areas and the reflective pattern are the same, a condition termed photometric balance is achieved. The camera is so calibrated that the optimum exposure aperture setting is obtained at photometric balance; photometric balance thereby serves as an indication of optimum exposure aperture setting.

Figure 3:
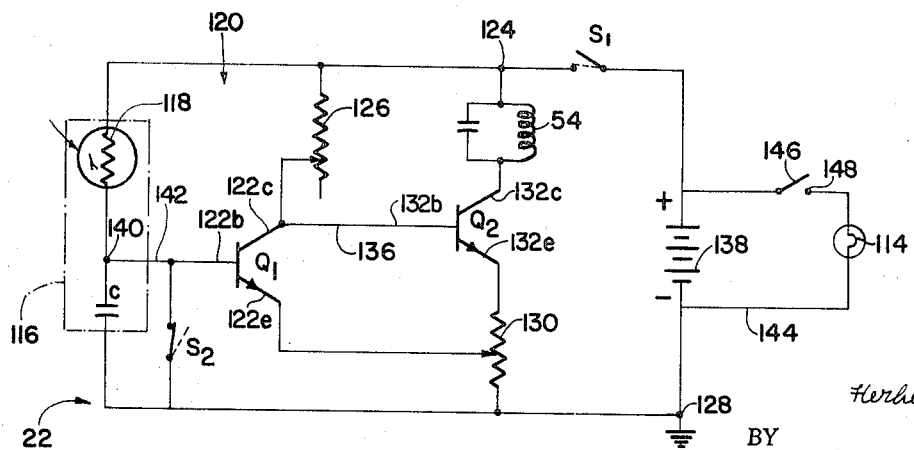
FIG. 3 is a schematic electrical diagram of one control circuit for use in the exposure control apparatus of FIG. 2.

Second photoresponsive means 22 includes electrical timing circuit means 120 having network 116 which includes photosensitive element 118 arranged to receive illumination from the scene being photographed. The timing circuit may be for example, a transistorized two output stage Schmitt-type trigger circuit responsive to output voltage from network 116. A circuit of this type is shown in FIG. 3. Circuit 120 has a normally not-conducting stage that includes transistor $Q_1$ preferably of a silicon type, having base, collector and emitter electrodes $112b$, $122c$ and $122e$, respectively. Collector electrode $122c$ of $Q_1$ is connected to terminal 124 of the shutter timing apparatus by variable bias resistor 126, and emitter electrode $122e$ of $Q_1$ is connected to terminal 128 of the shutter timing apparatus by variable bias resistor 130. The normally conducting stage of circuit 120 includes transistor $Q_2$ having base, collector and emitter electrodes $132b$, $132c$ and $132e$, respectively. Collector electrode $132c$ is connected to terminal 124 through solenoid 54 so that the latter is energized when $Q_2$ conducts. Base electrode $132b$ of $Q_2$ is connected to collector electrode $132c$ of $Q_1$ through lead 136, and emitter electrode $132e$ of $Q_2$ is connected through bias resistor 130 to terminal 128. It should be noted that with this arrangement there is essentially a common emitter resistor, the adjustment to resistor 130 being for the purpose of establishing the voltage at which it is desired to trigger circuit 120. While the two stages of circuit 120 have been characterized as "normally not-conducting" and "normally-conducting" is should be obvious that this characterization is applicable only when a voltage source is applied across terminals 124 and 128.

Network 116 includes capacitor means C in series with photosensitive element 118, such as a cadmium sulfide photocell or the like exposed to light from the scene being photographed and having a resistance inversely related to the level of scene brightness. Network 116 is connected between terminals 124 and 126 of the shutter timing apparatus so as to form a conventional integrator circuit whose input terminal is at 124 and whose output terminal is at 140, the connection between the capacitor means and the photosensitive element. Terminal 140 is connected by fixed impedance 142 to base electrode 122b of $Q_1$, the latter electrode constituting the input electrode of normally not-conducting stage.

Voltage source 138 is shown in the form of a battery of potential $E_0$ connected from terminal 128 to terminal 124 through normally open switch S1. Voltage is applied across terminals 124 and 128 by operator means 26. The operator means includes shaft 154 which is provided with switch operating end 155 engageable with one of the contacts of switch S1. When the shaft is manually depressed, the contacts of switch S1 will be closed.

The sequence of events that occur as a result of the depression of the shaft will now be explained. The initial depression of the shaft closes the contacts of S1 before operation of retaining means 46 effects release of opening shutter blade 34. Since human reaction time involved in depressing and releasing the shaft, and the inertial delay of the lever in returning to its normal position, substantially exceeds the longest average exposure apt to be used under normal "snap-shot" conditions of scene brightness, the contacts of switch S1 will be closed for at least as long as the correct exposure time.

The $Q_2$ stage of circuit 120 incorporates base electrode 132b as its input, collector electrode 132c as its output, and emitter electrode 132c common to the input and output. Resistor 126 coupled between input electrode 132b and terminal 124 acts as a fixed base resistor for providing, when S1 is closed, a fixed base current bias that causes $Q_2$ to conduct instantaneously with the closing of S1. The setting of variable resistor 126 establishes the degree to which $Q_2$ conducts so that the current through solenoid 54 can be adjusted to provide the proper magnetomotive force in the magnetic circuit of holding means 42, for preventing accidental release of closing blade 36 when the opening blade moves to unblocking position to initiate exposure. The flow of current through resistors 126 and 130, when $Q_2$ conducts, establishes at the collector and emitter electrodes of $Q_1$, bias voltages having first values dependent upon the magnitudes of the respective currents and resistance values.

Until the initial displacement of the opening blade out of its blocking position, the contacts of S2 are maintained in a closed condition. Connection 140 is at an initial value of voltage, namely ground potential, at the instant S1 is closed. When the voltage at connection 140 is at its initial value and the voltages at the collector and emitter electrodes of $Q_1$ are at their first values of bias voltage due to the conduction of $Q_2$, the collector-base and emitter-base junction of $Q_1$ are reverse biased, thus resulting in $Q_1$ being cut off. For this reason, it may be said that the bias of $Q_1$ is primarily established by the voltage at connection 140.

Meanwhile, the current through the solenoid builds rapidly to its maximum value causing the maximum retaining force to be exerted on the closing blade shortly after S1 is closed and just prior to the operation of retaining means 46 to release the opening blade for movement out of blocking position. The initial movement of the opening blade causes disengagement of the contacts of S2, thereby opening the same to apply the voltage source across network 116 and activate the same.

The opening S2 in activating network 116, causes it to generate a voltage at connection 140. The voltage causes $Q_1$ to be reverse biased and cut-off; it then changes with time, reaching a preselected value, termed the trigger voltage, which forward biases $Q_1$, in a period of time termed the trigger generation time.

When the time variable voltage at connection 140 reaches the trigger voltage, it causes the emitter-base junction of $Q_1$ to be forward biased. Element 118 then functions like a base resistor the value of which is dependent upon the level of scene brightness and provides base current bias that causes $Q_1$ to conduct, producing collector current at the output electrode thereof which flows through resistor 126 increasing the voltage drop thereacross lowering the voltage at the input electrode of $Q_2$. This reduces the forward bias on $Q_2$ thus decreasing the flow of current through the latter and causing a reduction in the voltage drop across bias resistor 130 thereby increasing the forward bias on $Q_1$ even more. This regenerative feedback between the stages of voltage sensitive trigger circuit 120 will cause conduction to switch rapidly from $Q_2$ to $Q_1$. The different flows of current through bias resistors 126 and 130 after switching takes place establish second values of bias voltages at electrodes 122c and 122e of $Q_1$ such that the conduction of $Q_2$ is severely and rapidly reduced, thereby rapidly de-energizing solenoid 54 to effect rapid release of the closing blade.

When the closing blade is released, it begins to move out of unblocking position, and will terminate exposure at its blocking position as explained previously.

Referring again to FIG. 3, circuit 144 connects photometer lamp 114 and contacts 146 and 148 across voltage source 138. The lamp is ignited when the contacts are closed, as described hereafter.

Aperture setting means 24 comprises overlying blades 150 and 152 pivotally connected to each other at bearing 153. The overlying portions of the blades are contoured to define diaphragm means 159, 161 and 163, wherein diaphragm means 159 sets the exposure aperture size, diaphragm 161 is a variable light attenuating control for aperture 104 of photometer means 92 and diaphragm 163 is a variable light attenuating control for aperture 165 of photoresponsive element 118. Blades 150 and 152 are positionable at various angular positions relative to each other to simultaneously vary the size of all three diaphragms.

Means for operating the aperture setting means and the shutter means includes control shaft 154 and knob 156. The control shaft carries cam 158 providing means for moving blades 150 and 152 to various relative angular positions for varying the size of the aforementioned diaphragms. As shown in FIG. 2, the axes of the exposure aperture, apertures 104 and 165, and bearing 153 lie in a common plane.

Cam 158 may take the form of a cylindrical member having complementary wedgelike surfaces 160 and 162 each inclined in a more or less helical arrangement around the axis of the cam. The axial ends of the cam member 158 are reduced in diameter to be rotatably mounted in spaced fixed bearing supports 164 integrally formed on portion 28 of housing 12. Each of blades 150 and 152 has an extension 166 and 168, respectively, projecting therefrom adjacent the region of bearing 153 and terminating in free-cam following ends that lie adjacent to opposite surfaces 160 and 162 of cam 158. The ends are urged into engagement with the cam surfaces by a wire spring 170 wrapped around bearing 153 and pressing at its opposite ends against projections 172 and 174 on the respective diaphragm blades. As a consequence of this construction, rotation of cam 158 serves to impart simultaneous but oppositely directed pivotal movement to blades 150 and 152. Thus, the effective areas of photometer aperture 104, exposure aperture 14, and aperture 165 are either increased or decreased simultaneously.

Shaft 154 of operator means 26 is square and is longitudinally slidable in a square aperture in cam 158, one end thereof extending upwardly from the cam and terminating in an end portion 176 projecting into control knob 156 and the other end extending downwardly and forming a round extension 178. The round extension operatively connects with member 74 of shutter actuating means 46 and operates to close normally open switch S1 when shaft 154 is depressed. As shown best in FIG. 2, control knob 156 has base 192 which has a cylindrical bearing portion 180 rotatably mounted in boss 182 and a cylindrical portion 184 that extends from the base toward cam 158. Portion 184 includes annularly recessed portion 186, from which springs 188 are mounted for biasing knob 156 in the upward direction indicated by arrow 190. The cylindrical bearing portion 180 when engaging boss 182, constitutes stop means for limiting axial displacement of the knob in the upward direction. The base 192 of the knob is provided with a square axial aperture within which shaft 154 is axially slidable. The aperture through base 192 opens into enlarged circular recess 194 in the free end of knob 156 that faces toward the exterior of the housing.

The upper end 176 of shaft 154 carries a circular rod 196, which is of a diameter greater than the diagonal dimension of the shaft, rigidly attached to the shaft, and defining a shoulder against which portion 192 of the knob is engageable.

Portion 204 of the knob 156, a cylindrical extension of base portion 196, is provided with a plurality of individual axially extending cantilevered segments that surround rod 196. Preferably, the segments are formed by properly slotting portion 204. The outer surface of portion 204 defines coaxial surfaces adapted to be grasped between the fingers of the user and squeezed. Rod 196 is of such cross section relative to these segments as to define therebetween an annular region 208 within which radial deflection of the segments can be accommodated.

Contact arms 146 and 148 are provided for completing an electrical circuit through reference lamp 114 (see FIG. 3). Spring contact arm 146 is engaged by the lower portion of the knob 156 and serves to bias the latter upward relative to the shaft. Contact arm 148, on the other hand, bears against an insulated washer 202 carried by shaft 154, urging it downward relative to the knob. This serves to resiliently maintain knob 156 and shaft 154 in the relative positions shown in FIG. 2. When knob 156 is squeezed, shaft 154 is moved relative to knob 156 and contact arms 146 and 148 connect to complete the electrical circuit.

Operation of the above described exposure control system of this invention will now be described.

For any given photographic film sensitivity, a certain predetermined exposure value is required for optimum photographic exposure. Two variable factors affect photographic exposure value. These are shutter speed and the percent of transmission of optical elements at the exposure aperture. The exposure control device first sets the exposure aperture to regulate the percent transmission and achieve a rough, or gross setting; then it controls the shutter speed over a relatively narrow range to achieve a fine, or vernier control.

In producing a photographic exposure, the scene to be photographed is observed through viewfinder 90. Comparison photometer 92 is operated to visually determine the level of brightness of the scene so that the size of the exposure aperture may be selected accordingly. To make the visual determination of scene brightness, the light entering photometer 92 from the scene to be photographed is compared to ilumination from lamp 114, having a known luminous energy output.

Portion 204 of knob 156 is squeezed so that the axially extending cantilever sections thereof bear against rod 196 to lift rod 196 and attached shaft 154 relative to the knob and thereby close contacts 146 and 148 to ignite lamp 114. Illumination reflected by reflecting pattern 113 of target 112 is observed at eye piece 210, adjacent viewfinder eye lens 94. At the same time, portion 204 of knob 156 is being squeezed, it is rotated to variably adjust diaphragm 161. Diaphragm 161 is variably adjusted until the amount of light from the scene to be photographed entering the photometer and being observed through the transparent portions of target 112 is such that the intensity of illumination observable through the transparent areas of the targets and the illumination from lamp 114 reflected from reflecting portions of target 112 reach optimum levels wherein they are, or approach the same. Knob 156 is then released. The aforesaid rotation of knob 156 simultaneously adjusts the size exposure aperture diaphragm 159 and photosensitive element aperture diaphragm means 163. The adjustment of photometer aperture diaphragm means 161 to achieve the desired brightness reading thereby operates to select the appropriate exposure aperture for the brightness of the scene being photographed and selects the proper effective size of the element aperture 165 according to the selected size of the exposure aperture.

The selected sizes of the exposure aperture 14 and photosensitive element aperture 165 determine the exposure value; the size of the exposure aperture determining the light transmitting characteristics thereof, and the size of aperture 165 influencing the amount of light incident upon photosensitive element 118 and thus the duration of the exposure interval. These two control factors are calibrated to provide the optimum exposure value for a given photographic film sensitivity. For example, when the available scene illumination is within the range wherein an adjustment of blades 150 and 152 will admit that predetermined amount of illumination through diaphragm means 161 which produces the condition of photometric balance in the comparison photometer, diaphragm means 159 and 163 also admit predetermined amounts of illumination through exposure aperture 14 and aperture 165, respectively. Since the amount of illumination incident upon photoresponsive element 118 is constant, the exposure interval will be of constant, predetermined duration. Exposure aperture diaphragm 159 is so calibrated that the amount of light admitted through the exposure aperture during this interval of constant duration provides the optimum exposure value for the given film sensitivity. On the other hand, if the comparison photometer is operated to select an exposure aperture which is either too large or too small to provide optimum exposure value in conjunction with an exposure interval of the aforesaid constant duration, according to available scene illumination, the element aperture diaphragm means will be adjusted to provide a correspondingly large or small element aperture. The change in the effective size of the element aperture changes the amount of scene light to which the circuit is responsive so that the duration of the exposure interval is decreased or increased from the aforesaid interval of constant duration by an amount designed to provide an optimum exposure through the exposure aperture actually selected.

The operation of aperture setting means 24 will now be further described. Rotation of knob 156 causes shaft 154 and thus cam 158 to rotate. Converging cam surfaces 160 and 162 thus move relative to extensions 166 and 168 of blades 150 and 152 so that blades 150 and 152 are pivotally moved relative to each other to simultaneously increase or decrease the effective sizes of the three apertures. Maximum apertures are illustrated in FIG. 2. When it is desired to reduce the effective size of the apertures, the knob 156 is rotated counterclockwise. Extensions 166 and 168 on blades 150 and 152 ride along converging cam surfaces 160 and 162 and impart pivotal movement to the blades, which movement creates a greater amount of overlappage therebetween and decreases the sizes of the three apertures. Similarly, clockwise rotation of knob 156 enlarges the effective sizes of the apertures.

The effective sizes of the three apertures may be determined by variably controlling the actual sizes thereof, as in the embodiment illustrated and described herein; the effective sizes may also be determined by other means which suitably vary the light transmitting characteristics of the apertures, for example, a variable density light filter.

After selection of the correct exposure aperture setting, shutter means 16 is operated to produce photographic exposure. Shuttter means 16, in FIG. 2, is shown in the exposure producing position; however, in the cocked position, prior to exposure, opening blade 34 is positioned over exposure aperture 14, in light blocking arrangement therewith, and retained in such position by engagement between elongated portion 50 of bias spring 38 and seat 88 of head portion 76 of the retaining means 46.

In operation of shutter means 16, portion 206 of rod 196 is depressed to move shaft 154 and knob 156 axially downward, opposite the direction of arrow 190, to close switch S1 and activate timing circuit 120 of second photoresponsive means 22. The timing circuit operates to energize solenoid 54 to magnetically attract keeper 58 of shutter blade 36 to core 56.

Continued depression of shaft 154 rotates member 74 such that cam surface 82 thereof lifts elongated portion 78 of member 72 to rotate member 72 on its mounting and thereby move head portion 76 thereof out of engagement with elongated portion 50 of spring 38. Spring 38 is thus free to move opening blade 34 from its aperture blocking position to its aperture unblocking position, shown in FIG. 2. Closing blade 36 is retained in the aperture unblocking position by magnetic engagement between keeper 58 and core 56 of electromechanical holding means 42 for a time interval depending upon the amount of light passing through aperture 165 and incident on photosensitive element 118 as explained above. At termination of the interval, solenoid 54 of electromechanical holding means 42 is deenergized to release keeper 58. Elongated portion 52 of spring means 40, acting on channel bearing surface 60 of the keeper, advances closing blade 36 toward and to its aperture blocking position to thereby terminate the exposure. Portion 206 is then released and springs 188 return shaft 154 and knob 156 to the raised position.

Subsequent to each exposure, the shutter blades must be reset to their original positions. Reset arm 66 is moved upward in slot 67 to rotate reset lever 64 so that projections 68 thereof engage elongated portion 50 of spring means 38 and advance the same against its bias, to thereby advance opening blade 34 and closing blade 36 along track 48 toward and to their initial reset positions wherein blade 36 is in unblocking position to the exposure aperture and blade 34 is in blocking position relative to the exposure aperture.

Advancement of spring portion 50 eventually causes it to strike and ride upon cam surface 86 of member 72, at least partially depressing head portion 76 thereof against the action of spring 84. Shutter blades 34 and 36 and electromechanical holding means 42 are so arranged that, simultaneously with the aforesaid striking action of spring portion 50 upon cam surface 86, keeper 58 strikes core 56 to block further movement of the shutter blades when they reach their respective initial positions. Overtravel of reset lever 64, subsequent to blocking of shutter blade movement, is permitted due to the flexibility of elongated spring portion 50. Overtravel of the reset lever flexes portion 50 to press shutter blades 34 and 36 tightly against each other, overcome the bias of spring drive means 38 and 40 and urge keeper 58 into close contact with core 56 of electromechanical holding means 42 so that it may subsequently be positively engaged thereby. The overtravel producing movement of reset lever 64, then advances portion 50 of spring 38 past cam surfaces 86 of member 72 onto seat 88 thereof. Head portion 76 of member 72 then returns to its raised position in response to the action of spring 84, so that seat 88 engages portion 50 and maintains it in its flexed position to thereby maintain the shutter blades and keeper 58 in the above described positions. Reset arm 66 is released. Spring 70 returns reset arm 66 and reset lever 64 to their rest positions, shown in FIG. 2. The apparatus is then in position for subsequent exposure producing operation.

It can be appreciated that the exposure control apparatus of this invention achieves accurate photographic exposures by use of apparatus incorporating two co-operating photoresponsive control mechanisms which are independently responsive to the light level of the scene being photographed.

Since certain changes may be made in the above apparatus without departing from the scope of the invention herein involved, it is intended that all matter contained in the above description or shown in the accompanying drawings shall be interpreted as illustrative and not in a limiting sense.

I claim:
1. Exposure control apparatus for a photographic camera comprising:
 (a) a pair of blade members defining an exposure aperture and a second aperture adapted to receive light from a scene being photographed, the size of said apertures being proportionately varied as a function of relative movement of said blade members with respect to each other;
 (b) means for selectively adjusting the relative positions of said blade members with respect to each other whereby the size of said apertures is varied accordingly;
 (c) shutter means for unblocking and blocking said exposure aperture to establish an exposure interval;
 (d) first photoresponsive means responsive to light from such scene for indicating the selection of a particular effective size of said exposure aperture which is approximately optimized for photographing such scene; and
 (e) second photoresponsive means positioned in operative relationship with said second aperture for influencing the duration of said exposure interval produced by said shutter means.

2. Exposure control apparatus according to claim 1 wherein said first photoresponsive means comprises a comparison photometer.

3. Exposure control apparatus according to claim 1 wherein said comparison photometer comprises:
 (a) a transparent target having a reflective pattern on one side thereof;
 (b) a source of light located adjacent said one side for illuminating said pattern;
 (c) means defining a variable aperture for admitting illumination from said scene into said photometer;
 (d) means for directing said illumination from said scene onto the side of said target opposite said one side; and
 (e) means for permitting comparison of the relative levels of illumination transmitted through said target and reflected therefrom.

4. Exposure control apparatus according to claim 1 wherein said second photoresponsive means comprises electrical circuit means responsive to the brightness of scene illumination for variably controlling the operation of said shutter means to thereby vary duration of said exposure interval in accordance with said brightness of scene illumination.

5. Exposure control apparatus according to claim 1 wherein said pair of blades further define a variable aperture for controlling the amount of light incident upon said first photoresponsive means.

6. Exposure control apparatus for a photographic camera comprising:
 (a) means defining a variable exposure aperture;
 (b) shutter means for unblocking and blocking said exposure aperture to establish an exposure interval;
 (c) first photoresponsive means for variably influencing selection of exposure aperture size in accordance with the brightness of scene illumination;
 (d) second photoresponsive means for influencing the duration of said exposure interval in accordance with the brightness of scene illumination;
 (e) first means defining a variable aperture for admitting light from a scene being photographed to said first photoresponsive means;

(f) second means defining variable aperture for admitting light from said scene to said second photoresponsive means;

(g) aperture setting means controlling the size of said first variable aperture means in accordance with the brightness of scene illumination for governing the influence of said first photoresponsive means upon selection of exposure aperture size and for adjusting the size of said second variable aperture means, in accordance with the selected exposure aperture size.

7. Exposure control apparatus for a photographic camera comprising:

(a) means defining a variable exposure aperture;

(b) shutter means for unblocking and blocking said exposure aperture to establish an exposure interval;

(c) a transparent target having a reflective pattern thereon;

(d) a light source for illuminating said pattern;

(e) first means defining a variable aperture for admitting illumination from said scene into said photometer;

(f) means for directing said illumination from said scene onto said target;

(g) means for permitting comparison of the relative levels of illumination transmitted through said target and reflected therefrom;

(h) electrical circuit means for variably controlling the operation of said shutter means;

(i) a photosensitive element in said circuit arranged to receive illumination from said scene for establishing an electrical parameter in said circuit which is variable in accordance with the brightness of scene illumination to thereby variably influence the duration of said exposure interval in accordance with said scene brightness;

(j) second means defining a variable aperture between said photosensitive element and said scene illumination; and (k) aperture setting means for simultaneously adjusting the sizes of said first and second aperture defining means and said exposure aperture, said aperture setting means being selectively operated until said first aperture means attain a size whereby said relative levels of illumination transmitted through said target and reflected therefrom attain an optimum level to indicate optimum size selection for said exposure aperture and second aperture means.

8. Exposure control apparatus for a photographic camera comprising:

(a) an adjustable aperture control mechanism defining an exposure aperture and two additional apertures, the sizes of all of which are simultaneously and concomitantly variable to control the amount of light permitted to pass therethrough;

(b) shutter means for unblocking and blocking said exposure aperture to establish an exposure interval;

(c) first photoresponsive means responsive to the light passing through one of said additional apertures for indicating the selection of a particular size of said exposure aperture which is approximately correct in accordance with the illumination of a scene; and (d) second photoresponsive means responsive to the light passing through the other of said additional apertures for controlling said shutter means to vary said exposure interval.

9. Exposure control apparatus according to claim 8 wherein:

(a) said first photoresponsive means comprises a comparison photometer; and (b) said second photosensitive means comprises electrical circuit means responsive to the exposure aperture size selected by said first photoresponsive means and light passing through the other of said additional apertures for controlling said shutter means to vary the exposure interval.

References Cited

UNITED STATES PATENTS

| | | | |
|---|---|---|---|
| 3,299,789 | 1/1967 | Chandler et al. | 95—64 |
| 3,362,309 | 1/1968 | Cooper et al. | 95—10 |
| 3,416,867 | 12/1968 | Biber | 95—10 |
| 3,397,629 | 8/1968 | Mori et al. | 95—10 |

NORTON ANSHER, Primary Examiner

R. L. MOSES, Assistant Examiner

U.S. Cl. X.R.

95—64